United States Patent Office 2,953,548
Patented Sept. 20, 1960

2,953,548

POLYAMIDES FROM BRANCHED CHAIN DIACIDS

Stuart Schott and Harry Greenberg, Cincinnati, Ohio, assignors to National Distillers and Chemical Corporation, New York, N.Y., a corporation of Virginia No Drawing. Filed July 22, 1955, Ser. No. 523,926

4 Claims. (Cl. 260—78)

The present invention relates to new compositions of matter and their preparation and, more particularly, to novel synthetic linear condensation polyamides possessing fiber-forming properties.

In general, the novel compositions of matter embodied herein are prepared by reacting a suitable diamine with selected branched-chain dicarboxylic acid reactants or an amide-forming derivative of said dicarboxylic acid reactants, the reaction being carried out under condensation polymerization conditions until polyamides of relatively high molecular weight are produced. As is described hereinafter, and by practice of embodiments of the invention, synthetic linear polyamides may be produced possessing highly useful properties and, particularly depending on the dicarboxylic acid reactant employed, the polyamides may be varied as to fiber-forming characteristics, cold-drawability properties, and others.

In preparation of the novel polyamide products embodied herein, the diamine reactant may comprise a primary or secondary diamine characterized by having at least one hydrogen atom attached to each nitrogen atom. Thus, suitable diamines include di-primary amines, primary-secondary amines, and di-secondary amines. Of such amines, aliphatic diamines are preferred, such amines being characterized by having the nitrogen atoms attached to aliphatic carbon atoms. More preferably, the aliphatic diamines contemplated for usage herein are those of relatively long chain length, as for example, a chain length of four or more carbon atoms, with specific examples thereof being aliphatic diamines such as tetramethylene diamine, pentamethylene diamine, hexamethylene diamine, octamethylene diamine, decamethylene diamine, and the like. Structurally, diamines suitable for practice of this invention may be defined as having the formula, $NH_2CH_2RCH_2NH_2$ in which R is a divalent hydrocarbon radical free from olefinic and acetylenic unsaturation and which has a chain length of at least two carbon atoms. Although such amines in which R is an aliphatic chain are preferred, diamines of the aforesaid structural formula in which R may be alicyclic, aromatic or araliphatic are also contemplated.

A particularly important aspect of this invention is the selected dicarboxylic acid reactant or preferably mixtures of reactants employed for reaction with the diamines, or mixtures thereof. For practice of this invention, the dicarboxylic acid reactant comprises isomeric, branched chain $C_{10}$ aliphatic diacids and mixtures containing substantial amounts of such branched chain diacids, and especially a mixture of such $C_{10}$ diacids made up from and including substantial amounts and major proportions of α-ethylsuberic and α,α'-diethyladipic acids. These branched chain $C_{10}$ diacids and mixtures thereof are preferably, but not necessarily, obtained as mixtures and by a particular method as further described below. Thus the polyamides to which the invention relates may be prepared by reaction between a suitable diamine and one or more branched chain $C_{10}$ dibasic acids having at least one $C_2$ branch per molecule, and more preferably, as described more fully hereinafter, by reaction of a suitable diamine with a mixture of dicarboxylic acid reactants in which one or more of the branched chain $C_{10}$ aliphatic diacids is employed in admixture with other dibasic carboxylic acids, illustrative of which are acids such as adipic acid, suberic acid, sebacic acid, and others. Thus, the novel polyamides as embodied herein are characterized by containing a plurality of units of the following structure:

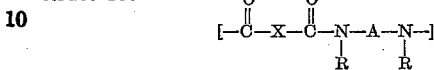

in which X is a hydrocarbon portion of a $C_{10}$ saturated aliphatic dicarboxylic acid, A is a hydrocarbon portion of a diamine, and R is hydrogen, alkyl or an aryl radical; said polyamides being further characterized in that the major proportion of such units of the aforesaid polyamide structure are such that X is the hydrocarbon portion of a $C_{10}$ saturated aliphatic diacid containing at least one $C_2$ branch chain per molecule.

It has recently been found that an aliphatic conjugated diolefin can be treated with finely dispersed sodium or potassium in a selected ether medium and in the presence of a relatively small amount of polycyclic aromatic hydrocarbon and/or a solid attrition agent at a temperature preferably below 0° C. to give a mixture of dimetallo derivatives of the dimerized diolefin. These dimetallo derivatives can then be carbonated at a temperature below 0° C. to give the corresponding salts of dicarboxylic acids in high yields and selectivities.

In the case of the initial reaction using sodium and butadiene, the product obtained comprises the disodium derivatives of the aliphatic isomeric octadienes. Studies of the structure of the saturated diacids arising therefrom after carbonation and hydrogenation indicates that mixtures of isomeric $C_{10}$ dicarboxylic acids are obtained. Thus, following final hydrogenation and acidification, the product mixture yields sebacic acid, α-ethylsuberic acid, and α,α'-diethyladipic acid, together with small amounts of other acids including monobasic carboxylic acids.

The resulting final reaction mixture contains varying amounts of sodium salts of isomeric $C_{10}$ dicarboxylic acids. It also contains the valuable branched chain $C_{10}$ diacids as well as small amounts of monobasic acids of varying molecular weights from $C_5$ to $C_{13}$.

The major portions of the linear isomer, sebacic acid, can be separated from this mixture for instance, by saturation of the solution with sodium chloride and addition of controlled amounts of a strong acid. Benzene extraction can also be used. This produces an isomeric mixture of $C_{10}$ aliphatic dicarboxylic acids containing from 60–90% α-ethylsuberic acid, 10–25% of α,α'-diethyladipic acid, and the remainder, 0–15%, substantially sebacic acid.

Generally, the polyamide products as embodied herein are prepared by subjecting a suitable diamine and the appropriate $C_{10}$ acidic reactants to amidation or transamidation reaction conditions with elimination of water or other by-products formed by the reaction.

The polyamides embodied herein may be prepared by heating in substantially equimolecular amounts a suitable diamine and a dicarboxylic acid reactant comprising the above $C_{10}$ dicarboxylic acids as aforesaid under condensation polymerization conditions, generally from about 180° to about 300° C., in the presence or absence of a diluent, until relatively high molecular weight linear condensation polyamides are obtained and, preferably, until the polyamide possesses fiber-forming properties. Preferably, the polyamides embodied herein are prepared by use of a dicarboxylic acid reactant comprising a selected mixture of dicarboxylic acids whereby the resulting polyamides are fiber-forming to give fibers of excellent cold-drawable characteristics. The preparation of polyamides as embodied herein may be carried out in any of several ways. For example, the diamine and dicarboxylic acid reactant may be intimately mixed in proper proportions and the mixture subjected to condensation-polymerization conditions in which which case the first reaction that occurs is the formation of diamine-dicarboxylic acid salts, followed by polymerization to formation of polyamides. Another method comprises preparation of a mixture of proper proportions of the diamine and dicarboxylic acid reactant and subjecting the mixture to conditions for formation of diamine-dicarboxylic acid salts, isolation of the salts, purification thereof if desired, and subjecting the salts to reaction conditions for polyamide formation.

As aforesaid, polyamides as embodied herein may also be prepared by use of an amide-forming derivative of the dicarboxylic acid component or components. For such preparations, use is contemplated of amide-forming derivatives of the branched chain $C_{10}$ dibasic acids, and/or of other dibasic carboxylic acids used in mixture herewith, such amide-forming derivatives including anhydrides, amides, acid halides, half-esters and diesters which are known to form amides when reacted with a primary or secondary amine. Specific amide-forming derivatives contemplated for use herein include esters of the branched chain $C_{10}$ diacids, illustrative of which are the diethyl and dimethyl esters of $\alpha$-ethylsuberic acid and of $\alpha,\alpha'$-diethyladipic acid and mixtures thereof.

A surprising and valuable property of the polyamides described in this invention is their unusual clarity as opposed to the opaque to translucent nature of those exclusively prepared from straight chain diacids. In the many applications where clarity is essential, these products are of great usefulness, particularly where clarity is present in combination with the other excellent properties of the polyamide products. Thus, these products possess the excellent tensile strength, high softening point and solvent resistance characteristics of polyamides, and the additional attribute of optical clarity heretofore generally unobtainable in this type of product.

In order to further describe the invention, but without intent of limitation, the following illustrative embodiments are set forth. In the preparations set forth, the reactions were carried out under a blanket of dry oxygen-free nitrogen at both atmospheric and subatmospheric pressures in all-glass polymerization reaction vessels heated to suitable reaction temperatures by provision of constant temperature conditions such as vapor jackets with stable compounds at their boiling points. All parts are by weight unless otherwise specified.

*Example 1*

An intimate mixture of 7.15 parts of the pure salt of octamethylene diamine and $\alpha$-ethylsuberic acid (M.P. 185–186° C.) and 1.13 parts of the pure salt of octamethylene diamine and $\alpha,\alpha'$-diethyladipic acid (M.P. 222–224° C.) was placed in a reaction vessel. This reaction apparatus comprised a nitrogen purification train and a reaction vessel heated in a vapor bath. The reaction vessel was fitted with an inlet for nitrogen used to sweep out water formed during the condensation and an outlet leading to a vacuum pump. The total reaction mixture represents an acid composition of 85% $\alpha$-ethylsuberic acid and about 13% $\alpha,\alpha'$-diethyladipic acid. This reaction mixture was heated for two hours at 200° C. at atmospheric pressure. The heating was continued for an additional six hours at 265° C., the final half hour being run at 0.2 mm. Hg. On cooling to room temperature, a clear, light yellow solid high molecular weight polyamide copolymer was obtained having a softening point of 182° C. This transparent copolymer was drawn into fibers, showing at least 100% elongation characteristics on cold drawing.

*Example 2*

A sample of a mixture of $\alpha$-ethylsuberic acid, $\alpha,\alpha'$-diethyladipic acid, and sebacic acid was prepared by removal of a substantial portion of the sebacic acid from the mixture obtained by reaction of butadiene and sodium followed by carbonation of the resulting reaction mixture. This mixture was dissolved in aqueous formamide solution and extracted with cyclohexane to remove high molecular weight monobasic acids. The recovered dibasic acid was then steamed to remove low molecular weight monobasics ($C_5$ and $C_9$). Purification by vacuum distillation at 0.2 mm. Hg gave a fraction of dibasic acid having a neutral equivalent of 101.4.

Stoichiometric quantities of this diacid and hexamethylene diamine (10.11 parts to 5.81 parts) were dissolved in alcohol-water directly in the polymerization apparatus.

Both free water and some water of reaction were removed at atmospheric pressure and 200° C. during a period of 1.5 hours. The temperature was raised to 265° C. and maintained for two hours. The pressure was then reduced to 0.2 mm. Hg and kept at 265° C. for thirty minutes and for three hours at 285° C. The resulting clear, colorless polymer gave fibers exhibiting excellent cold draw properties. It had a softening point of 182–183° C.

*Example 3*

A mixture of $C_{10}$ dibasic acids comprising about 74% $\alpha$-ethylsuberic acid, 16% $\alpha,\alpha'$-diethyladipic acid and 10% sebacic acid, purified by extraction followed by crystallization from toluene-hexane to remove monobasic acids, was used in this experiment with hexamethylene diamine to produce the corresponding polyamides. The pressure-temperature-time schedule was identical with those described in Example 2 above. The final polymer product was a water clear polymer showing excellent cold drawing properties and having a softening temperature of 185° C.

*Example 4*

A 10% aqueous solution containing 15.91 parts of the salt of $\alpha$-ethylsuberic acid and decamethylene diamine was adjusted to pH 7.65 to ensure exact stoichiometric proportions. The solution was heated in an atmosphere of pure nitrogen, first to remove free water and then to remove the water of chemical reaction. The bulk of the water was removed at 200° C. and heating was continued for 2 hours. The temperature was then raised to 260° C. for 1 hour during which time the viscosity increased considerably. A vacuum was then applied (0.3 mm. Hg) at this temperature and maintained for six hours. The product was a substantially colorless polymer, possessing extreme clarity from which fibers could be drawn possessing excellent cold draw.

*Example 5*

To approximately 100 parts of 10% solution of hexamethylene diammonium salt of the mixed $C_{10}$ diacids described in Example 3 (at pH 7.65) was added 10 parts of the pure salt of hexamethylene diammonium adipate (M.P. 195° C.). This solution was evaporated to dryness in an atmosphere of nitrogen and then heated at 200° C. at atmospheric pressure for 3 hours. This was followed by heating at 260° C. for 4 additional hours at a pressure of 0.3 mm. mercury whereby a tough, transparent polyamide was obtained which gave fibers possessing excellent cold draw.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A synthetic linear condensation product, capable of being drawn into fibers, which is a polyamide of (1) a diamine from the group consisting of saturated primary aliphatic hydrocarbon diamines of at least 4 carbon atoms and saturated secondary aliphatic hydrocarbon diamines of at least 4 carbon atoms and (2) a dicarboxylic acid reactant from the group consisting of (a) α-ethylsuberic acid and (b) α-ethylsuberic acid in mixture with at least one member from the group consisting of α,α'-diethyladipic acid and saturated aliphatic hydrocarbon straight chain dicarboxylic acids and in which mixture the α-ethylsuberic acid is in major amount by weight.

2. A product, as defined in claim 1, wherein the saturated aliphatic hydrocarbon straight chain dicarboxylic acid is a member from the group consisting of sebacic acid and adipic acid.

3. A product, as defined in claim 1, wherein the dicarboxylic acid reactant consists essentially of from about 60 to about 90% α-ethylsuberic, about 10 to about 25% of α,α'-diethyladipic acid, and the remainder sebacic acid.

4. A product, as defined in claim 1, wherein the diamine is from the group consisting of octamethylene diamine, hexamethylene diamine and decamethylene diamine.

References Cited in the file of this patent

UNITED STATES PATENTS

| | | |
|---|---|---|
| 2,130,948 | Carothers | Sept. 20, 1938 |
| 2,533,455 | Hagemeyer | Dec. 12, 1950 |
| 2,824,118 | Frank et al. | Feb. 18, 1958 |

OTHER REFERENCES

Baker et al.: Chemical Abstracts, vol. 41, page 2731 (1947).

Brewster: Journal of American Chem. Soc., vol. 73, pages 366–370, January 1951.